Nov. 15, 1949     R. R. WEST     2,487,997
STRAIGHT BEAM ADJUSTABLE JAW QUICK RELEASE CLAMP
Filed Aug. 28, 1944
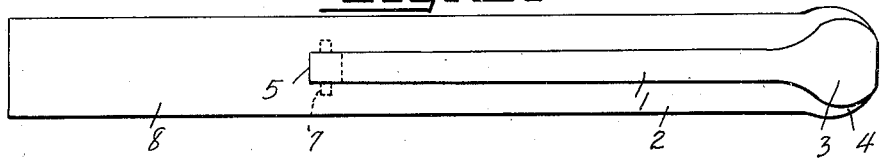
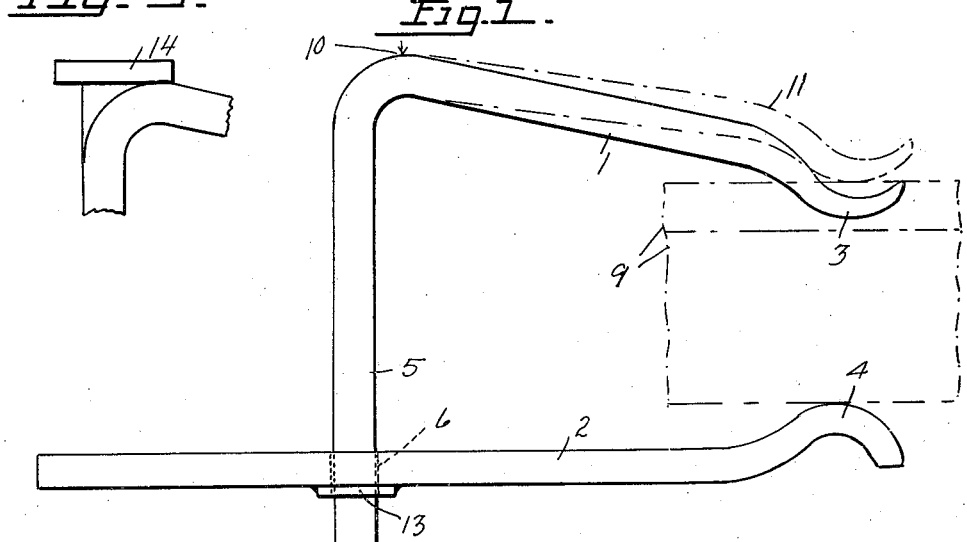
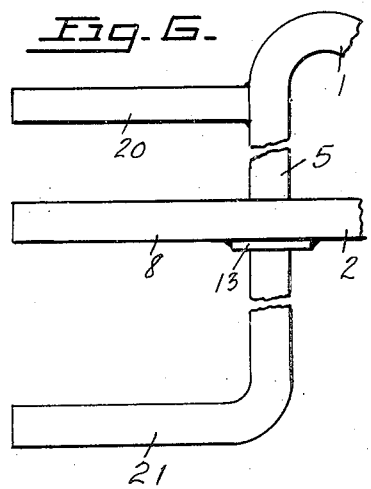
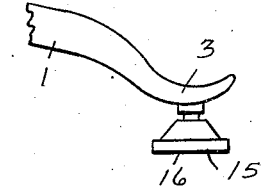
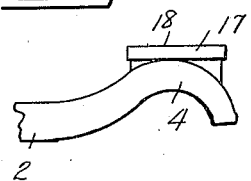
INVENTOR.
ROGER ROLLESTON WEST
BY
Boyken, Mohler & Beckley
ATTORNEYS.

Patented Nov. 15, 1949

2,487,997

UNITED STATES PATENT OFFICE 2,487,997

STRAIGHT BEAM ADJUSTABLE JAW QUICK RELEASE CLAMP

Roger Rolleston West, San Francisco, Calif.

Application August 28, 1944, Serial No. 551,532

3 Claims. (Cl. 144—303)

This invention relates to a portable, quick release clamp and has for one of its objects the provision of a rugged, economically made, simple clamp adapted to be practically instantly manipulated into gripping relation to work of different kinds and sizes and which clamp may be as quickly released from such work.

Another object of the invention is the provision of a clamp having opposed work gripping and compressing elements one of which has a handle for manually holding the same at one side of work to be gripped while the other element is adapted to be carried thereby for movement into tight engagement with the opposite side of such work under the impact of a hammer against an impact receiving surface that is connected with such element for such purpose without being dependent on a sliding movement of gripping surfaces on the work, or upon the shape of the work to permit such sliding, or upon the friction of the gripping surfaces on the work for their clamping effect. Automatically operative means is provided for holding the two elements tightly gripping said work between them irrespective of the size of the work which may be of any desired thinness, and which means is instantly releasable from so holding said elements upon striking a part connected with one of said elements.

Briefly described, the present invention is usable with advantage over other clamps in most places where conventional screw clamps are now used. The conventional screw clamps require turning of a screw to tighten and to release the hold of the clamp on the work, and while improvements have been made in such clamps for expediting the movement of the work gripping surfaces into clamping engagement with the work, the said clamps are still objectionably slow for use in many places.

The present invention overcomes the objection to the use of conventional clamps in many industries where a quick clamping and a quick releasing clamp is highly desirable.

In the drawings,

Fig. 1 is a side elevational view of a quick release clamp of this invention. The dot-dash lines indicate the work to be clamped and the modified position of one of the arms during clamping of such work due to its resilience.

Fig. 2 is a plan view of the clamp of Fig. 1.

Fig. 3 is a fragmentary elevational view of a structure that may be employed in connection with the invention as disclosed in Fig. 1 for receiving the impact of any suitable implement that may be used for moving the clamping members of Fig. 1 into clamping relation to the work.

Fig. 4 is a fragmentary elevational view of a swivel member that may be used on one of the jaws of the clamp of Fig. 1 for engaging one side of work to be clamped between the jaws.

Fig. 5 is a fragmentary elevational view of a work engaging member that may be carried by one of the jaws of the clamp of this invention if desired.

Fig. 6 is a fragmentary elevational view of manually manipulatable handles for plier-like manipulation for moving the clamping elements of the clamping arms into gripping relation if such manipulation is desired.

In detail, an upper arm 1 and a lower arm 2 (as seen in Fig. 1) extending generally in the same direction are provided. The arm 1 is formed at one end with a portion 3 projecting toward arm 2, while the corresponding end of arm 2 is formed with a portion 4 projecting slightly toward arm 1 (Fig. 1). The surfaces of said portions 3, 4 facing each other are in opposed relation and form work gripping surfaces, preferably convex in contour. As seen in Fig. 2 these portions may be flattened so as to provide adequate gripping surfaces. This convexity of the surface of portion 3 in particular, is desirable to allow for a rolling contact with the work without sliding, since as will be later described, the arm 1 is resilient to a certain degree. The shape of the work gripping surfaces may however be of any other form except flat so as to permit of a rolling contact without sliding to allow for the resilient relative movement of the arms 1 and 2. This movement may also be taken care of by a swivelling member 15 Fig. 4 to be described later.

The arm 1 is provided with an angular extension 5 that extends through an opening 6 that is opposite portion 4. The arm 1 and its extension 5 are preferably formed from a single bar that is square or polygonal-sided in cross-sectional contour, and the outline of opening 6 is similar in shape to said cross-sectional contour, but is sufficiently larger than the extension to permit sufficient canting of the extension in the opening to automatically lock the extension relative to arm 2 in any position of the extension in said opening.

The lower end of extension 5 below arm 2 is provided with a stop 7 to preclude accidental removal of arm 2 from said extension.

The arm 2 continues past opening 6 to provide a handle 8 at the side of extension 5 that is opposite the portion 4. This handle 8 is adapted for grasping by one hand of an operator during positioning of said clamp in gripping relation to work 9 (dot-dash line in Fig. 1) and during release of the clamp from such work, the said handle 8 is provided with a substantially flat and wide surface on its upper side for receiving a blow for release. During such release either the handle is held in the open hand, or the upper arm is held at or near 10 in Fig. 1.

While I have correctly described arm 1 as extending in generally the same direction as arm 2, the said arm 1 preferably actually extends from extension 5 at a slight acute angle and in a direction convergent relative to arm 2 from the extension toward portion 3 as best seen in Fig. 1. The extension 5 normally extends through arm 2 substantially at right angles to the latter.

The arms 1 and 2 as shown in Fig. 1 and Fig. 2 are made of a substantial length, which length is adequate to obtain sufficient leverage about the opening 6 to ensure frictional locking, which length also permits the clamp to grasp work a substantial distance from its edges. Arm 1 is moreover made of a large length relative to its cross section, as shown particularly in Fig. 1 and Fig. 2, so as to have resilience adequate to take up any movement of arm 2 away from the work due to friction when the angular extension 5 is driven through the opening 6, as well as some deformation of the work; therefore when the work gripping portions 3, 4 are at opposite sides of work 9 and a hammer or other implement strikes the arm 1 in a downward direction at point 10 at the juncture between arm 1 and extension 5, the arm 1 will spring slightly to position 11 (Fig. 1) and at the same time the extension 5 will cant relative to opening 6 to be automatically frictionally locked into engagement with two of the opposite edges of said opening under the leverage and tension of said arm 1. The portions 3, 4 will be in tight gripping relation to the work 9 and the tightness of such relation as well as the tension of arm 1 depends upon the force of the blow at point 10. It will be seen that the work is clamped by direct movement of the work gripping surfaces towards each other, and not by canting or sliding any work gripping surface across work, and the clamping effect is therefore direct and is independent of friction between the work gripping surfaces and the work.

A plate 13 welded to the underside of arm 2 and having an opening in register with opening 6 may be provided if desired in order to increase the inertia of the lower arm.

In some instances a special impact receiving plate 14 may be provided at the juncture between arm 1 and extension 5 as seen in Fig. 3, although the impact receiving surface at point 10 (Fig. 1) is generally adequate and there is no noticeable injury to the arm at said point after repeated impacts.

The portion 3 may have a swivel member 15 which carries a flat gripping surface 16 that faces toward portion 4 (Fig. 4) while the latter portion may carry a plate 17 (Fig. 5) having a flat gripping surface 18 in opposed relation to surface 16. Any flexing of arm 2 or of arms 1 and 2 relatively does not disturb the relationship between the flat surfaces 16, 18 due to the swivelling of member 15 on portion 3. Of course, these portions 3, 4 may be straight continuations of arms 1 and 2 when the member 15 and plate 17 are provided.

In Fig. 6 I show a handle 20 projecting from extension 5 parallel with and above handle 8. Upon gripping handles 20 and 8 plier-fashion with the work 9 between the arms 1 and 2, the extension 5 will automatically lock with arm 2 in the same manner as already described.

In Fig. 6 an angular projection 21 on extension 5 below handle 8 may be provided for striking with any suitable implement for releasing the grip of the members 3, 4 on work 9.

The same numbers are used in all of the drawings to designate parts that are common to all forms disclosed.

It is to be understood that the illustrations and description are merely illustrative of a preferred form or forms of the invention and are not to be considered restrictive thereof.

One feature that is of appreciable importance is the provision of sufficient weight in one or both of the arms whereby the inertia thereof is such that a sharp or abrupt blow delivered for moving one of the arms toward the other will prevent the arm that is not so driven from having substantial movement. This inertia must be such that it can overcome the frictional resistance between the extension 5 and the opening 6 sufficiently to reduce the said movement of the arm that is not driven to less than that which can be taken up by the resilience of the driven arm. For this purpose as shown particularly in Fig. 2 the handle 8 and the lower arm 2, which in this case is the member that is not struck, is made of substantially greater weight than arm 1.

I claim:

1. In combination a quick release clamp comprising a pair of arms of similar and substantial length in generally opposed relationship, having opposedly facing work gripping surfaces formed at one of their ends, adapted to engage each other when said arms are moved a predetermined distance toward each other; an opening formed in the other end of one of said arms transversely thereof, and the corresponding end of the other arm being formed with an integral extension at an acute angle therefrom and passing loosely through said opening to provide for said movement of the arms towards each other, and for releasably locking said extension in said opening upon work being gripped between said surfaces, the arm having said extension being relatively resilient for providing a yieldable gripping engagement of said surfaces against opposite sides of such work over a wide range of gripping pressures; in addition to the said acute angle of the extension to its integral arm, the ends of both arms carrying the gripping surfaces being formed to make substantial projections towards each other, thereby leaving substantial clearance for the work between the two arms beyond their points of contact with said work, thereby enabling work of greater thickness towards its edges to be gripped and locked well inside said edges.

2. In combination a quick release clamp comprising a pair of arms of similar and substantial length in generally opposed relationship, having opposedly facing work gripping surfaces formed at one of their ends, adapted to engage each other when said arms are moved a predetermined distance toward each other; an opening formed in the other end of one of said arms transversely thereof, and the corresponding end of the other arm being formed with an integral extension at an acute angle therefrom and passing loosely through said opening to provide for said movement of the arms towards each other, and for releasably locking said extension in said opening upon work being gripped between said surfaces, the arm having said extension being relatively resilient for providing a yieldable gripping engagement of said surfaces against opposite sides of such work over a wide range of gripping pressures; in addition to the said acute angle of the extension to its integral arm, the ends of both arms carrying the gripping surfaces being formed to make substantial projections towards each other, thereby leaving substantial clearance for the work between the two arms beyond their points of contact with said work, thereby enabling work of greater thickness towards its edges to be gripped and locked well inside said edges, the arm having the extension having an impact receiving surface adjacent the junction with said extension, the arm having said opening being formed with a substantial handle in longitudinal extension thereof in a direction away from the gripping surfaces, said handle being long enough to be clear of any obstruction from the other arm or the said work and being large enough for easy manual grasping, and being formed with a relatively large and flat impact receiving surface to receive a hammer blow, the total weight of the arm and handle being considerably more than is required to equal the strength of the other arm.

3. In combination a quick release clamp comprising a pair of arms of similar and substantial length in generally opposed relationship, having opposedly facing work gripping surfaces formed at one of their ends, adapted to engage each other when said arms are moved a predetermined distance toward each other; a polygonal opening formed in the other end of one of said arms transversely thereof, and the corresponding end of the other arm being formed with an integral extension at an acute angle therefrom of a polygonal section conforming generally to the said polygonal opening, and passing loosely through said opening to provide for said movement of the arms towards each other without relative rotation, said substantial lengths of said arms forming levers for locking said extension in said opening upon work being gripped between said surfaces, the arm having said extension being relatively resilient for providing a yieldable gripping engagement of said surfaces against opposite sides of such work over a wide range of gripping pressures, the ends of both arms carrying the gripping surfaces being formed to make substantial projections towards each other, thereby leaving substantial clearance for the work between the said two arms when their said gripping surfaces are in contact with the said work, thereby enabling work of uniform thickness or of greater thickness towards its edges to be gripped well inside said edges without said work coming in contact with either of the arms along a line near said opening and thereby reducing the length of said levers and releasing the clamp; the contour of the gripping surfaces being rounded so as to form a rolling contact with the work without sliding on the two arms being driven together as by a hammer blow; the arm having the extension having an impact receiving surface formed on it adjacent the junction with the said extension; the arm having said opening having a substantial integral handle in longitudinal extension thereof in a direction away from the gripping surfaces, said handle being of a length to clear obstruction from the other arm or the work, and of a length to fit the hand for easy manual grasping, and being formed to have a relatively large and flat impact receiving surface to receive a hammer blow for releasing the clamp, said arm and integral handle having a plate added to it adjacent said opening, the combined weight of said arm with its integral handle and plate being substantially more than is required to equal the strength of the other arm, providing inertia of said combined weight to resist movement when the arm having the extension is driven through the opening as by a hammer blow.

ROGER ROLLESTON WEST.

REFERENCES CITED

The following references are of record in the file of this patent:

UNITED STATES PATENTS

| Number | Name | Date |
|---|---|---|
| 739,365 | Vogt | Sept. 22, 1903 |
| 845,665 | Ramsden | Feb. 26, 1907 |
| 1,547,198 | Braden | July 28, 1925 |
| 1,659,342 | Wetzler | Feb. 14, 1928 |
| 2,040,669 | Odmark | May 12, 1936 |